United States Patent
Kim et al.

(10) Patent No.: US 10,207,698 B2
(45) Date of Patent: Feb. 19, 2019

(54) METHOD AND APPARATUS FOR CONTROLLING MILD HYBRID ELECTRIC VEHICLE

(71) Applicant: Hyundai Motor Company, Seoul (KR)

(72) Inventors: Hyun Kim, Gyeonggi-do (KR); Ki Hong Kang, Gyeonggi-do (KR); Sung Il You, Gyeonggi-do (KR); Hwa Yong Jang, Gyeonggi-do (KR); Yong Ug Kim, Gyeonggi-do (KR); YoungMin Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 198 days.

(21) Appl. No.: 15/351,684

(22) Filed: Nov. 15, 2016

(65) Prior Publication Data

US 2017/0291594 A1 Oct. 12, 2017

(30) Foreign Application Priority Data

Apr. 11, 2016 (KR) ........................ 10-2016-0044322

(51) Int. Cl.
*B60W 20/10* (2016.01)
*B60K 6/26* (2007.10)
(Continued)

(52) U.S. Cl.
CPC ............... *B60W 20/10* (2013.01); *B60K 6/26* (2013.01); *B60K 6/48* (2013.01); *B60K 6/485* (2013.01);
(Continued)

(58) Field of Classification Search
CPC combination set(s) only.
See application file for complete search history.

(56) References Cited

U.S. PATENT DOCUMENTS

2016/0244048 A1* 8/2016 Sato .................... B60W 50/082

FOREIGN PATENT DOCUMENTS

JP H1198612 A * 4/1999 ............... B60K 6/20
JP 2005-291206 A 10/2005
(Continued)

OTHER PUBLICATIONS

JPH1198612 (A)—Apr. 9, 1999—English Translation (Year: 1999).*

*Primary Examiner* — Anne M Antonucci
*Assistant Examiner* — Renee LaRose
(74) *Attorney, Agent, or Firm* — Mintz Levin Cohn Ferris Glovsky and Popeo, P.C.; Peter F. Corless (57) ABSTRACT

A method and an apparatus for controlling a mild hybrid electric vehicle are provided. The method includes detecting data for operating the vehicle and determining a target torque of an engine based on the detected data. Additionally, the method includes determining whether an operating condition of a limiting logic of a combustion torque of the engine is satisfied based on a temperature of coolant of the engine and operating the limiting logic when the operating condition of the limiting logic is satisfied. A first available combustion torque of the engine is determined based on a speed of the engine and the temperature of the coolant when the limiting logic is operated and a target torque of a MHSG is determined based on the target torque of the engine and the first available combustion torque of the engine. The MHSG is then operated to generate the target torque of the MHSG.

16 Claims, 4 Drawing Sheets

(51) Int. Cl.
*B60K 6/48* (2007.10)
*F02N 11/04* (2006.01)
*B60K 6/485* (2007.10)
*B60W 10/06* (2006.01)
*B60W 10/08* (2006.01)
*B60W 20/11* (2016.01)

(52) U.S. Cl.
CPC ............ *B60W 10/06* (2013.01); *B60W 10/08* (2013.01); *B60W 20/11* (2016.01); *F02N 11/04* (2013.01); *B60W 2510/0604* (2013.01); *B60W 2510/0638* (2013.01); *B60W 2510/0676* (2013.01); *B60W 2510/107* (2013.01); *B60W 2510/244* (2013.01); *B60W 2520/10* (2013.01); *B60W 2540/10* (2013.01); *B60W 2710/0666* (2013.01); *B60W 2710/083* (2013.01); *Y02T 10/6221* (2013.01)

(56) References Cited

FOREIGN PATENT DOCUMENTS

| | | |
|---|---|---|
| JP | 2007-238039 A | 9/2007 |
| JP | 2008-038892 A | 2/2008 |
| JP | 2015-033971 A | 2/2015 |
| KR | 10-2008-0091530 A | 10/2008 |

\* cited by examiner

| °C \ RPM | ... | $W_1 \leq W_e < W_2$ | $W_2 \leq W_e < W_3$ | $W_3 \leq W_e < W_4$ | ... |
|---|---|---|---|---|---|
| ⋮ | ... | ... | ... | ... | ... |
| $T_1 \leq T_e < T_2$ | ... | A1 | B1 | C1 | ... |
| $T_2 \leq T_e < T_a$ | ... | A1 | B1 | C1 | ... |
| $T_a \leq T_e < T_3$ | ... | A2 | B2 | C2 | ... |
| $T_3 \leq T_e < T_4$ | ... | A3 | B3 | C3 | ... |
| ⋮ | ... | ... | ... | ... | ... |

(A3<A2<A1, B3<B2<B1 and C3<C2<1)

FIG. 4

| °C \ RPM | ... | $W_5 \leq W_e < W_6$ | $W_6 \leq W_e < W_7$ | $W_7 \leq W_e < W_8$ | ... |
|---|---|---|---|---|---|
| ⋮ | ... | ... | ... | ... | ... |
| $T_5 \leq T_o < T_6$ | ... | D1 | E1 | F1 | ... |
| $T_6 \leq T_o < T_b$ | ... | D1 | E1 | F1 | ... |
| $T_b \leq T_o < T_7$ | ... | D2 | E2 | F2 | ... |
| $T_7 \leq T_o < T_8$ | ... | D3 | E3 | F3 | ... |
| ⋮ | ... | ... | ... | ... | ... |

(D3<D2<D1, E3<E2<E1 and F3<F2<F1)

METHOD AND APPARATUS FOR CONTROLLING MILD HYBRID ELECTRIC VEHICLE

CROSS-REFERENCE TO RELATED APPLICATION

This application claims priority to and the benefit of Korean Patent Application No. 10-2016-0044322 filed in the Korean Intellectual Property Office on Apr. 11, 2016, the entire contents of which are incorporated herein by reference.

BACKGROUND

(a) Field of the Invention

The present invention relates to a method and an apparatus for controlling a mild hybrid electric vehicle, and more particularly, to a method and apparatus for controlling a mild hybrid electric vehicle which suppress an excessive increase in temperature of a coolant without deteriorating power performance of the vehicle by using a mild starter and generator.

(b) Description of the Related Art

As is generally known in the art, a hybrid electric vehicle uses an internal combustion engine and a battery power source together. The hybrid electric vehicle efficiently combines torque of the internal combustion engine and torque of a motor. Hybrid electric vehicles may be classified into a hard type and a mild type based on a power sharing ratio between an engine and a motor. For the mild type of hybrid electric vehicle (hereinafter referred to as a mild hybrid electric vehicle), a mild hybrid starter and generator (MHSG) configured to start the engine or generate electricity based on an output of the engine is used instead of an alternator. For the hard type of hybrid electric vehicle, a driving motor for generating driving torque is used in addition to an integrated starter and generator (ISG) configured to start the engine or generate electricity.

The mild hybrid electric vehicle does not provide a driving mode in which torque of the MHSG is used as main driving torque, but the MHSG may assist torque of the engine according to running states of the vehicle and may charge a battery (e.g., a 48 V battery) through regenerative braking. Accordingly, fuel efficiency of the mild hybrid electric vehicle may be improved. Generally, temperature of an engine compartment is directly influenced by temperature of an engine. In a gasoline engine, increase control of a fuel amount (or air amount) and advance control of ignition timing are performed to increase torque. In a diesel engine, increase control of a fuel amount is performed to increase torque. In other words, when torque of the engine is increased according to a demand torque of a driver, thermal energy generated by combustion of fuel is increased, and thus the temperature of the engine and the temperature of the engine compartment are increased.

High temperature generated in a combustion process may be transmitted to a cylinder wall, a cylinder head, and a piston valve, and knocking may occur. When the engine is excessively cooled, efficiency of the engine may be deteriorated and fuel consumption may be increased. Accordingly, a thermostat for maintaining coolant of the engine within a predetermined range is disposed between the engine and a radiator. When temperature of the coolant is high, the thermostat generates displacement of a valve to circulate the coolant through the radiator, and when the temperature of the coolant is low, the thermostat closes the valve to cause the coolant to bypass the radiator. Even though the thermostat is used for adjusting the temperature, when the vehicle is driving on an uphill road during acceleration, the temperature of the coolant may be excessively increased. The torque of the engine may be decreased for solving the problem, however, power performance (e.g., acceleration performance) of the vehicle may be deteriorated.

The above information disclosed in this section is merely for enhancement of understanding of the background of the invention and therefore it may contain information that does not form the prior art that is already known in this country to a person of ordinary skill in the art.

SUMMARY

The present invention provides a method and an apparatus for controlling a mild hybrid electric vehicle having advantages of suppressing an excessive increase in temperature of a coolant without deteriorating power performance of the mild hybrid electric vehicle by using a mild starter and generator (MHSG).

A method for controlling a mild hybrid electric vehicle according to an exemplary embodiment of the present invention may include: detecting data for operating the mild hybrid electric vehicle; determining a target torque of an engine based on the detected data; determining whether an operating condition of a limiting logic of a combustion torque of the engine is satisfied based on a temperature of coolant of the engine; operating the limiting logic when the operating condition of the limiting logic is satisfied; determining a first available combustion torque of the engine based on a speed of the engine and the temperature of the coolant when the limiting logic is operated; determining a target torque of a mild hybrid starter and generator (MHSG) based on the target torque of the engine and the first available combustion torque of the engine; and operating the MHSG to generate the target torque of the MHSG.

The target torque of the engine may be determined based on a position value of an accelerator pedal (e.g., an engagement degree), a speed of a mild hybrid electric vehicle, and the speed of the engine. The operating condition of the limiting logic may be satisfied when the temperature of the coolant is equal to or greater than a first predetermined temperature. The first available combustion torque of the engine may be determined using a map in which the first available combustion torque of the engine based on the speed of the engine and the temperature of the coolant is set.

The method may further include, when the target torque of the MHSG is greater than an available torque of the MHSG, operating the MHSG to generate the available torque of the MHSG, determining whether a releasing condition of the limiting logic of the combustion torque of the engine is satisfied when the limiting logic is operated, and releasing the limiting logic when the releasing condition of the limiting logic is satisfied. The releasing condition of the limiting logic may be satisfied when the temperature of the coolant is equal to or less than a second predetermined temperature. The method may further include determining whether the operating condition of the limiting logic is satisfied based on a temperature of oil of a transmission.

Additionally, the method may include, when the limiting logic is operated: determining a second available combustion torque of the engine based on the speed of the engine and the temperature of the oil; determining a final available combustion torque of the engine as a smaller value among the first available combustion torque and the second available combustion torque; and determining the target torque of the MHSG based on the target torque of the engine and the final available combustion torque of the engine. When the limiting logic is operated, the method may include determining whether a releasing condition of the limiting logic of the combustion torque of the engine is satisfied based on the temperature of the coolant and the temperature of the oil; and releasing the limiting logic when the releasing condition of the limiting logic is satisfied.

An apparatus for controlling a mild hybrid electric vehicle according to an exemplary embodiment of the present invention may include: an engine configured to combust fuel; a mild hybrid starter and generator (MHSG) configured to start the engine or generate electricity based on an output of the engine; a data detector configured to detect data for operating the mild hybrid electric vehicle; and a controller configured to determine a target torque of the engine based on the detected data, determine whether an operating condition of a limiting logic of a combustion torque of the engine is satisfied, and operate the limiting logic when the operating condition of the limiting logic is satisfied. The controller may further be configured to determine a first available combustion torque of the engine based on a speed of the engine and a temperature of coolant when the limiting logic is operated, determine a target torque of the MHSG based on the target torque of the engine and the first available combustion torque of the engine, and operate the MHSG to generate the target torque of the MHSG.

The controller may be configured to determine the target torque of the engine based on a position value of an accelerator pedal (e.g., an engagement degree), a speed of the mild hybrid electric vehicle, and the speed of the engine. The operating condition of the limiting logic may be satisfied when the temperature of the coolant is equal to or greater than a first predetermined temperature. The controller may be configured to determine the first available combustion torque using a map in which the first available combustion torque based on the speed of the engine and the temperature of the coolant is set.

When the target torque of the MHSG is greater than an available torque of the MHSG, the controller may be configured to operate the MHSG to generate an available torque of the MHSG. The controller may be configured to determine whether a releasing condition of the limiting logic of the combustion torque of the engine is satisfied when the limiting logic is operated, and release the limiting logic when the releasing condition of the limiting logic is satisfied. The releasing condition of the limiting logic may be satisfied when the temperature of the coolant is equal to or less than a second predetermined temperature. The controller may further be configured to determine whether the operating condition of the limiting logic is satisfied based on a temperature of oil of a transmission.

In addition, the controller may be configured to determine a second available combustion torque of the engine based on the speed of the engine and the temperature of the oil when the limiting logic is operated, determine a final available combustion torque of the engine as a smaller value among the first available combustion torque and the second available combustion torque, and determine a target torque of the MHSG based on the target torque of the engine and the final available combustion torque of the engine. The controller may then be configured to determine whether a releasing condition of the limiting logic of the combustion torque of the engine is satisfied based on the temperature of the coolant and the temperature of the oil when the limiting logic is operated, and release the limiting logic when the releasing condition of the limiting logic is satisfied.

According to an exemplary embodiment of the present invention, an excessive increase in temperature of the coolant may be suppressed without deteriorating power performance of the mild hybrid electric vehicle.

BRIEF DESCRIPTION OF THE DRAWINGS

The above and other objects, features and advantages of the present disclosure will be more apparent from the following detailed description taken in conjunction with the accompanying drawings.

DESCRIPTION OF SYMBOLS

10: engine
20: transmission
30: MHSG
40: battery
50: differential gear apparatus
60: wheel
70: data detector
80: controller

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In the following detailed description, the present invention will be described more fully with reference to the accompanying drawings, in which exemplary embodiments of the invention are shown. However, the present invention is not limited the exemplary embodiments which are described herein, and may be modified in various different ways. Parts which are not related with the description are omitted for clearly describing the exemplary embodiment of the present invention, and like reference numerals refer to like or similar elements throughout the specification. Since each component in the drawings is arbitrarily illustrated for easy description, the present invention is not particularly limited to the components illustrated in the drawings.

Figure 1:
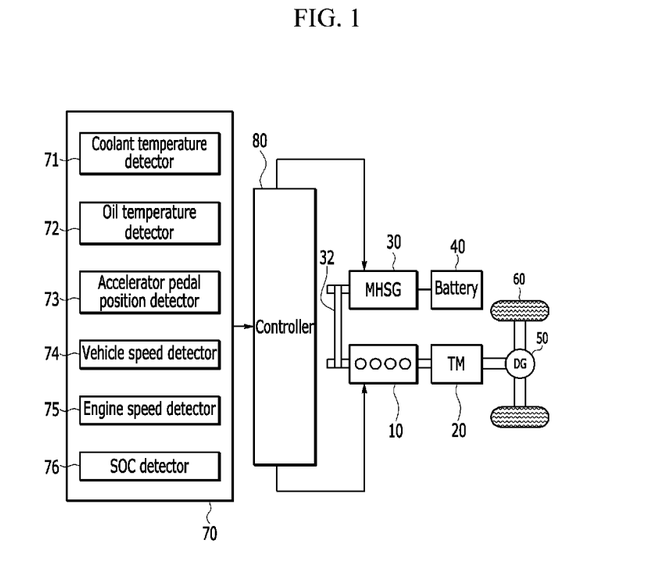
FIG. 1 is a block diagram of a mild hybrid electric vehicle according to an exemplary embodiment of the present invention.

FIG. 1 is a block diagram of a mild hybrid electric vehicle according to an exemplary embodiment of the present invention. As shown in FIG. 1, a mild hybrid electric vehicle according to an exemplary embodiment of the present invention may include an engine 10, a transmission 20, a mild hybrid starter and generator (MHSG) 30, a battery 40, a differential gear apparatus 50, a wheel 60, a data detector 70, and a controller 80.

The engine 10 combusts fuel to generate torque, and various engines such as a gasoline engine, a diesel engine, and a liquefied petroleum injection (LPI) engine may be used as the engine 10. In connection with torque transmission of the mild hybrid electric vehicle, torque generated from the engine 10 may be transmitted to an input shaft of the transmission 20, and torque output from an output shaft of the transmission 20 may be transmitted to an axle via the differential gear apparatus 50. The axle rotates the wheel 60 to operate the mild hybrid electric vehicle by the torque generated from the engine 10.

The MHSG 30 may be configured to start the engine 10 or generate electricity based on an output of the engine 10. In addition, the MHSG 30 may assist the torque of the engine 10. In other words, the torque of the engine 10 may be used as main torque and torque of the MHSG 30 may be used as auxiliary torque. The engine and the MHSG 30 may be connected to each other via a belt 32. The battery 40 may be configured to supply electricity to the MHSG 30, and may be charged by electricity recovered through the MHSG 30 in a regenerative braking mode. The battery 40 may be a 48 V battery. The mild hybrid electric vehicle may further include a low voltage direct current-direct current (DC-DC) converter (LDC) configured to convert a voltage supplied from the battery 40 into a low voltage, and a 12 V battery configured to supply a low voltage to electrical loads (e.g., a headlamp, an air conditioner, and a wiper).

The data detector 70 may be configured to detect data for operating the mild hybrid electric vehicle, and the data detected by the data detector 70 may be transmitted to the controller 80. The data detector 70 may include a coolant temperature detector 71, an oil temperature detector 72, an accelerator pedal position detector 73, a vehicle speed detector 74, an engine speed detector 75, and a state of charge (SOC) detector 76. The various detectors may be sensors mounted within the vehicle. The data detector 70 may further include other detectors (e.g., a brake pedal position detector and on the like) for operating the mild hybrid electric vehicle. The coolant temperature detector 71 may be configured to measure a temperature of coolant of the engine 10, and transmit a signal that corresponds thereto to the controller 80. The oil temperature detector 72 may be configured to measure a temperature of oil of the transmission 20, and transmit a signal that corresponds thereto to the controller 80.

Additionally, the accelerator pedal position detector 73 may be configured to detect a position value of an accelerator pedal (i.e., an engagement degree of the accelerator pedal or the amount of pressure exerted onto the pedal), and transmit a signal that corresponds thereto to the controller 80. When the accelerator pedal is fully engaged, the position value of the accelerator pedal is 100%, and when the accelerator pedal disengaged (e.g., no pressure is exerted onto the pedal), the position value of the accelerator pedal is 0%. The vehicle speed detector 74 may be configured to measure a speed of the mild hybrid electric vehicle, and transmit a signal that corresponds thereto to the controller 80. The engine speed detector 75 may be configured to measure a speed of the engine 10, and transmit a signal that corresponds thereto to the controller 80. Lastly, the SOC detector 76 may be configured to detect a state of charge (SOC) of the battery 40, and transmit a signal that corresponds thereto to the controller 80. Instead of directly detecting the SOC of the battery 40, a current and a voltage of the battery 40 may be measured to estimate the SOC of the battery 40.

The controller 80 may be configured to operate the engine 10, the transmission 20, and the MHSG 30 based on the data detected by the data detector 70. The controller 80 may be configured to determine a target torque of the engine 10 for operating the mild hybrid electric vehicle based on the data, and determine a combustion torque of the engine 10 and a target torque of the MHSG 30 to satisfy the target torque of the engine 10. For these purposes, the controller 80 may be implemented with one or more processors executed by a predetermined program. The predetermined program may include a series of commands for performing each step included in a method for controlling the mild hybrid electric vehicle according to an exemplary embodiment of the present invention to be described below.

Figure 2:
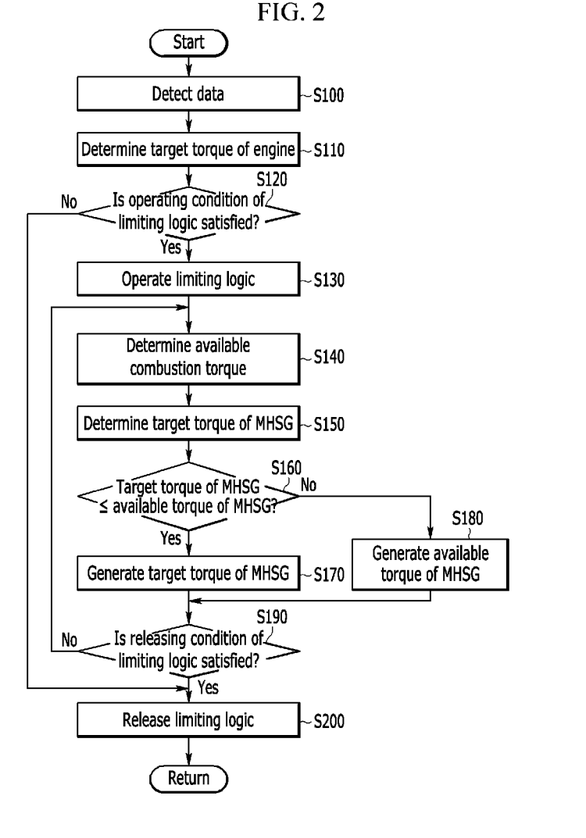
FIG. 2 is a flowchart of a method for controlling a mild hybrid electric vehicle according to an exemplary embodiment of the present invention.

FIG. 2 is a flowchart of a method for controlling a mild hybrid electric vehicle according to an exemplary embodiment of the present invention. As shown in FIG. 2, a method for controlling a mild hybrid electric vehicle according to an exemplary embodiment of the present invention may begin with detecting data for operating the mild hybrid electric vehicle at step S100. The coolant temperature detector 71 may be configured to measure the temperature of the coolant of the engine 10, the oil temperature detector 72 may be configured to measure the temperature of the oil of the transmission 20, the accelerator pedal position detector 73 may be configured to detect the position value of the accelerator pedal, the vehicle speed detector 74 may be configured to detect the speed of the mild hybrid electric vehicle, the engine speed detector 75 may be configured to detect the speed of the engine 10, and the SOC detector 76 may be configured to detect the SOC of the battery 40.

The controller 80 may then be configured to determine the target torque of the engine 10 at step S110. Further, the controller 80 may be configured to determine the target torque of the engine 10 based on the position value of the accelerator pedal, the speed of the mild hybrid electric vehicle, and the speed of the engine 10. The target torque of the engine may be determined by the controller 80 by further considering drivability (e.g., acceleration performance) of the mild hybrid electric vehicle and torque loss due to loads such as through the belt 32 and the air conditioner. The controller 80 may be configured to determine the combustion torque of the engine 10 and the target torque of the MHSG 30 to satisfy the target torque of the engine 10. The controller 80 may further be configured to adjust ignition timing, an air amount, a fuel amount, and air/fuel ratios to generate the combustion torque of the engine 10.

Additionally, the controller 80 may be configured to determine whether an operating condition of a limiting logic of the combustion torque of the engine 10 is satisfied based on the temperature of the coolant or the temperature of the oil at step S120. The operating condition of the limiting logic may be satisfied when the temperature of the coolant is equal to or greater than a predetermined temperature Ta (e.g., about 100° C.). The predetermined temperature Ta may be set by a person of ordinary skill in the art considering performance of the engine. In addition, the operating condition of the limiting logic may be satisfied when the temperature of the oil is equal to or greater than a predetermined temperature Tb (e.g., about 150° C.). The predetermined temperature Tb may be set by a person of ordinary skill in the art considering performance of the transmission 20. When the mild hybrid electric vehicle is being driven on an uphill road (e.g. inclined surface) during acceleration, the temperature of the coolant and the temperature of the oil may be rapidly increased.

When the operating condition of the limiting logic is not satisfied at step S120, the controller 80 may be configured to terminate the method for controlling the mild hybrid electric vehicle according to an exemplary embodiment of the present invention. In particular, the controller 80 may be configured to operate the engine 10 and the MHSG 30 based on the determined combustion torque of the engine 10 and the target torque of the MHSG 30. When the operating condition of the limiting logic is satisfied at step S120, the controller 80 may be configured to execute the limiting logic of the combustion torque of the engine 10 at step S130. When the limiting logic is executed, generable combustion torque of the engine 10 (hereinafter referred to as available combustion torque) may be limited.

Figure 3:
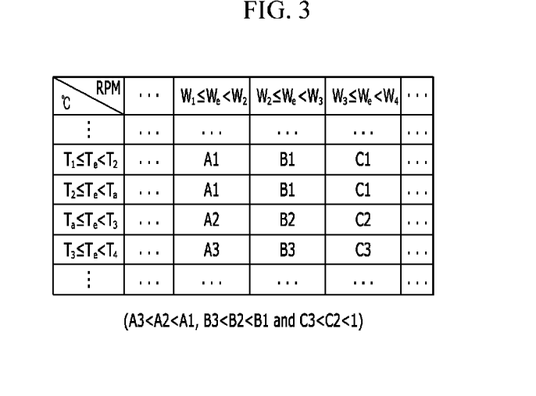
FIG. 3 is a diagram illustrating a map in which a first available combustion torque is set according to an exemplary embodiment of the present invention.

When the limiting logic is operated at step S130, the controller 80 may be configured to determine a first available combustion torque of the engine 10 based on the speed of the engine 10 and the temperature of the coolant at step S140. The first combustion torque of the engine 10 based on the speed of the engine 10 and the temperature of the coolant is exemplified in FIG. 3. As shown in FIG. 3, when the temperature Te of the coolant is equal to or greater than the predetermined temperature Ta (e.g., a first predetermined temperature), generable combustion torque of the engine 10 is limited, and a reduction amount of the combustion torque may be determined based on the speed We of the engine 10 and the temperature Te of the coolant. The controller 80 may be configured to determine the first available combustion torque using a map in which the first available combustion torque based on the speed We of the engine 10 and the temperature Te of the coolant is set.

The controller 80 may be configured to determine the target torque of the MHSG 30 based on the target torque of the engine 10 and the first available combustion torque of the engine 10 at step S150. In particular, the target torque of the MHSG 30 is a value obtained by subtracting the first available combustion torque of the engine from the target torque of the engine 10. The controller 80 may then be configured to compare the target torque of the MHSG 30 with an available torque of the MHSG 30 at step S160. The available torque of the MHSG 30 is maximum generable torque capable of being generated by the MHSG 30 in the current state, and may be calculated based on the SOC of the battery 40.

When the target torque of the MHSG 30 is equal to or less than the available torque of the MHSG 30 at step S160, the controller 80 may be configured to operate the MHSG 30 to generate the target torque of the MHSG 30 at step S170. In particular, the target torque of the engine 10 is a value obtained by adding the first available combustion torque of the engine 10 to the target torque of the MHSG30, and the controller 80 may be configured to operate the engine 10 to generate the first available combustion torque of the engine 10. Accordingly, an excessive increase in temperature of the coolant may be suppressed without decreasing the target torque of the engine 10. When the target torque of the MHSG 30 is greater than the available torque of the MHSG 30 at step S160, the controller 80 may be configured to operate the MHSG 30 to generate the available torque of the MHSG 30 at step S180.

When the limiting logic is executed at step S130, the controller 80 may be configured to determine whether a releasing condition of the limiting logic of the combustion torque of the engine 10 is satisfied at step S190. The releasing condition of the limiting logic may be satisfied when the temperature of the coolant is equal to or less than a predetermined temperature Tc (e.g., a third predetermined temperature or about 105° C.). In addition, the releasing condition of the limiting logic may be satisfied when the temperature of the oil is equal to or less than a predetermined temperature Td (e.g., a fourth predetermined temperature or about 145° C.). The predetermined temperature Tc may be less than the predetermined temperature Ta, and the predetermined temperature Td may be less than the predetermined temperature Tb (e.g., a third predetermined temperature).

When the releasing condition of the limiting logic is satisfied at step S190, the controller 80 may be configured to release the limiting logic at step S200. After that, the controller 80 may terminate the method for controlling the mild hybrid electric vehicle according to the exemplary embodiment of the present invention, and restarts from step S100. When the releasing condition of the limiting logic is not satisfied at step S190, the controller 80 may return to step S140. Meanwhile, the controller 80 may be configured to determine a second available combustion torque of the engine 10 based on the speed of the engine 10 and the temperature of the oil at step S140. The second available combustion torque of the engine 10 based on the speed of the engine 10 and the temperature of the oil is exemplified in FIG. 4.

Figure 4:
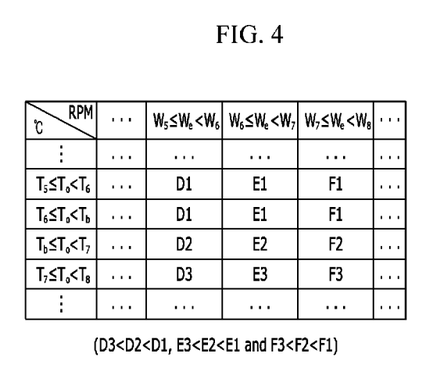
FIG. 4 is a diagram illustrating a map in which a second available combustion torque is set according to an exemplary embodiment of the present invention.

As shown in FIG. 4, when the temperature To of the oil is equal to or greater than the predetermined temperature Tb, generable combustion torque of the engine 10 is limited, and a reduction amount of the combustion torque may be determined based on the speed of We of the engine 10 and the temperature To of the oil. The controller 80 may be configured to determine the second available combustion torque using a map in which the second available combustion torque based on the speed We of the engine 10 and the temperature To of the oil is set. The controller 80 may be configured to determine a final available combustion torque of the engine 10 as a smaller value among the first available combustion torque and the second available combustion torque. The controller 80 may further be configured to determine the target torque of the MHSG 30 based on the target torque of the engine 10 and the final available combustion torque of the MHSG 30 at step S150. After that, the controller 80 may perform the forgoing steps S160 to S200.

As described above, in accordance with an exemplary embodiment of the present invention, by using the MHSG 30, an excessive increase in temperature of the coolant may be suppressed without deteriorating power performance of the mild hybrid electric vehicle.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A method for controlling a mild hybrid electric vehicle, comprising:
   detecting, by a controller, data for operating the mild hybrid electric vehicle;
   determining, by the controller, a target torque of an engine based on the detected data;
   determining, by the controller, whether an operating condition of a limiting logic of a combustion torque of the engine is satisfied based on a temperature of coolant of the engine;
   determining, by the controller, whether the operating condition of the limiting logic is satisfied based on a temperature of oil of a transmission;
   operating, by the controller, the limiting logic when the operating condition of the limiting logic is satisfied;
   determining, by the controller, a first available combustion torque of the engine based on a speed of the engine and the temperature of the coolant when the limiting logic is operated;
   determining, by the controller, a target torque of a mild hybrid starter and generator (MHSG) based on the target torque of the engine and the first available combustion torque of the engine;
   in response to operating the limiting logic:
      determining, by the controller, a second available combustion torque of the engine based on the speed of the engine and the temperature of the oil;
      determining, by the controller, a final available combustion torque of the engine as a smaller value among the first available combustion torque and the second available combustion torque; and
      determining, by the controller, the target torque of the MHSG based on the target torque of the engine and the final available combustion torque of the engine; and
   operating, by the controller, the MHSG to generate the target torque of the MHSG.

2. The method of claim 1, wherein the target torque of the engine is determined based on a position value of an accelerator pedal, a speed of a mild hybrid electric vehicle, and the speed of the engine.

3. The method of claim 1, wherein the operating condition of the limiting logic is satisfied when the temperature of the coolant is equal to or greater than a first predetermined temperature.

4. The method of claim 1, wherein the first available combustion torque of the engine is determined using a map in which the first available combustion torque of the engine based on the speed of the engine and the temperature of the coolant is set.

5. The method of claim 1, further comprising, when the target torque of the MHSG is greater than an available torque of the MHSG, operating, by the controller, the MHSG to generate the available torque of the MHSG.

6. The method of claim 1, further comprising:
   determining, by the controller, whether a releasing condition of the limiting logic of the combustion torque of the engine is satisfied when the limiting logic is operated; and
   releasing, by the controller, the limiting logic when the releasing condition of the limiting logic is satisfied.

7. The method of claim 6, wherein the releasing condition of the limiting logic is satisfied when the temperature of the coolant is equal to or less than a second predetermined temperature.

8. The method of claim 1, further comprising, when the limiting logic is operated:
   determining, by the controller, whether a releasing condition of the limiting logic of the combustion torque of the engine is satisfied based on the temperature of the coolant and the temperature of the oil; and
   releasing, by the controller, the limiting logic when the releasing condition of the limiting logic is satisfied.

9. An apparatus for controlling a mild hybrid electric vehicle, comprising:
   an engine configured to combust fuel;
   a mild hybrid starter and generator (MHSG) configured to start the engine or generate electricity based on an output of the engine;
   a data detector configured to detect data for operating the mild hybrid electric vehicle; and
   a controller configured to determine a target torque of the engine based on the detected data, determine whether an operating condition of a limiting logic of a combustion torque of the engine is satisfied, and operate the limiting logic when the operating condition of the limiting logic is satisfied,
   wherein the controller is configured to a first available combustion torque of the engine based on a speed of the engine and a temperature of coolant when the limiting logic is operated, determine whether the operating condition of the limiting logic is satisfied based on a temperature of oil of a transmission, determine a target torque of the MHSG based on the target torque of the engine and the first available combustion torque of the engine, determine a second available combustion torque of the engine based on the speed of the engine and the temperature of the oil when the limiting logic is operated, determines a final available combustion torque of the engine as a smaller value among the first available combustion torque and the second available combustion torque, determines a target torque of the MHSG based on the target torque of the engine and the final available combustion torque of the engine, and operate the MHSG to generate the target torque of the MHSG.

10. The apparatus of claim 9, wherein the controller is configured to determine the target torque of the engine based on a position value of an accelerator pedal, a speed of the mild hybrid electric vehicle, and the speed of the engine.

11. The apparatus of claim 9, wherein the operating condition of the limiting logic is satisfied when the temperature of the coolant is equal to or greater than a first predetermined temperature.

12. The apparatus of claim 9, wherein the controller is configured to determine the first available combustion torque using a map in which the first available combustion torque depending on the speed of the engine and the temperature of the coolant is set.

13. The apparatus of claim 9, wherein when the target torque of the MHSG is greater than an available torque of the MHSG, the controller is configured to operate the MHSG to generate an available torque of the MHSG.

14. The apparatus of claim 9, wherein the controller is configured to determine whether a releasing condition of the limiting logic of the combustion torque of the engine is satisfied when the limiting logic is operated, and release the limiting logic when the releasing condition of the limiting logic is satisfied.

15. The apparatus of claim 14, wherein the releasing condition of the limiting logic is satisfied when the temperature of the coolant is equal to or less than a second predetermined temperature.

16. The apparatus of claim 9, wherein the controller is configured to:
  determine whether a releasing condition of the limiting logic of the combustion torque of the engine is satisfied based on the temperature of the coolant and the temperature of the oil when the limiting logic is operated; and
  release the limiting logic when the releasing condition of the limiting logic is satisfied.

* * * * *